(12) United States Patent
Brecheisen, II

(10) Patent No.: US 7,530,336 B2
(45) Date of Patent: May 12, 2009

(54) INTAKE CONDENSATION REMOVAL FOR INTERNAL COMBUSTION ENGINE

(75) Inventor: Adell Warren Brecheisen, II, Hudson, IA (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 11/775,370

(22) Filed: Jul. 10, 2007

(65) Prior Publication Data

US 2009/0013977 A1    Jan. 15, 2009

(51) Int. Cl.
F02B 47/02    (2006.01)

(52) U.S. Cl. .................... 123/25 A; 60/605.2

(58) Field of Classification Search ............... 123/41.2, 123/41.25, 406.48, 568.11, 568.12, 568.22, 123/590, 542, 563; 60/605.2
See application file for complete search history.

(56) References Cited

U.S. PATENT DOCUMENTS

| | | | |
|---|---|---|---|
| 2,581,334 A | | 1/1952 | Reggio |
| 5,551,234 A | * | 9/1996 | Ochoizki .................... 60/599 |
| 5,771,868 A | * | 6/1998 | Khair .................... 123/568.12 |
| 6,062,026 A | * | 5/2000 | Woollenweber et al. .... 60/605.2 |
| 6,367,256 B1 | | 4/2002 | McKee |
| 6,681,171 B2 | * | 1/2004 | Rimnac et al. .............. 701/108 |
| 6,868,840 B2 | * | 3/2005 | Lewallen .................... 123/563 |
| 7,007,680 B2 | | 3/2006 | Tussing et al. |
| 2002/0189256 A1 | * | 12/2002 | Kalish ...................... 60/605.2 |
| 2004/0069284 A1 | | 4/2004 | Corba |
| 2004/0079079 A1 | * | 4/2004 | Martin et al. .............. 60/605.2 |
| 2004/0244782 A1 | * | 12/2004 | Lewallen ............... 123/568.12 |
| 2006/0124115 A1 | * | 6/2006 | Brookshire et al. .... 123/568.12 |

* cited by examiner

*Primary Examiner*—Michael Cuff
*Assistant Examiner*—Hung Q Nguyen

(57) ABSTRACT

An engine intake condensation removal system includes a valve for bypassing flow around a charge air cooler (CAC) to a liquid separator and mixer. The separator is downstream of the CAC and the mixer is downstream of the liquid separator. The mixer controls the amount of bypass flow to heat fluid flow from the CAC to a level higher than the dew point of the fluid flowing through the engine intake. The bypass flow is placed in a heat exchange relationship with the conduit receiving the output of the CAC before mixing to raise the wall temperature sufficiently to prevent condensation.

23 Claims, 1 Drawing Sheet

INTAKE CONDENSATION REMOVAL FOR INTERNAL COMBUSTION ENGINE

FIELD OF THE INVENTION

The invention relates to internal combustion engines, and more particularly to systems for removing condensation from the intakes for such engines.

BACKGROUND OF THE INVENTION

Internal combustion engines, particularly those used for industrial, agricultural and commercial use have had to address issues of evermore stringent emissions requirements while still maintaining durability and efficiency that operators have come to expect with this type of engine. In the pursuit of reduced emissions, many engines are now provided with exhaust gas recirculation (EGR) systems. These systems circulate a portion of the products of combustion back to the intake of the engine for reducing combustion temperatures and therefore the production of nitrous oxides. While the systems of this type appropriately reduce oxides of nitrogen, they generate other technical problems that must be solved.

One particular problem is the potential for formation of liquid condensation in the intake leading to the engine. Frequently, the condensate has acidic products in it which can cause increased wear and/or corrosion of engine intake componentry. The problem is particularly acute when dealing with engines having low pressure EGR, i.e., EGR passing to the intake of the engine from a point in the system downstream of any turbocharger turbine connected to the engine. Running an engine with natural gas as a fuel also produces increased moisture in the EGR fluid.

When EGR fluid is passed through a charge air cooler, the reduction in temperature associated with cooling of the charge to increase its density may under certain circumstances reduce the temperature of the fluid below the dew point which causes the liquid to condense from the fluid stream. As stated previously, this condensation has an adverse affect on the system leading up to and including the engine combustion chamber.

Accordingly there exists a need in the art for an effective way to minimize, if not eliminate, condensation in the intake of an internal combustion engine system.

SUMMARY OF THE INVENTION

In one form, the invention is a system for controlling condensation in the intake of an internal combustion engine having a charge air cooler (CAC). The system includes a passage for air around the CAC and a valve for controlling air through the passage. A condensate trap is in series flow relation in the engine intake downstream of the CAC for removing liquid from the intake fluid stream. A mixer receives fluid from the passage downstream of the condensate trap for at least mixing fluid from the passage with the engine intake to raise the temperature in the intake above the dew point of the fluid flowing therethrough.

In another form, the invention is a method for operating an internal combustion engine having an intake and charge air cooler (CAC). The method has the steps of trapping condensate downstream of the CAC and providing a selective bypass flow around the CAC. The bypass flow is mixed into the engine intake downstream of the trapping of condensate to raise the temperature in the engine intake above the dew point of the fluid flowing therethrough.

In yet another form, the invention is an internal combustion engine system with an internal combustion engine having at least an air intake and a device in the air intake for pressuring air. A charge air cooler (CAC) is provided downstream of the pressurizing device and a bypass passage for air is provided around the CAC. A valve is provided for controlling air through the bypass passage. A condensate trap is provided in series flow relation in the engine intake downstream of the CAC for removing liquid from the intake fluid stream and a mixer receives fluid from the trap for at least mixing fluid from the bypass passage with the engine intake to raise the temperature in the intake above the dew point of the fluid flowing there through.

DETAILED DESCRIPTION OF THE INVENTION

Figure 1:
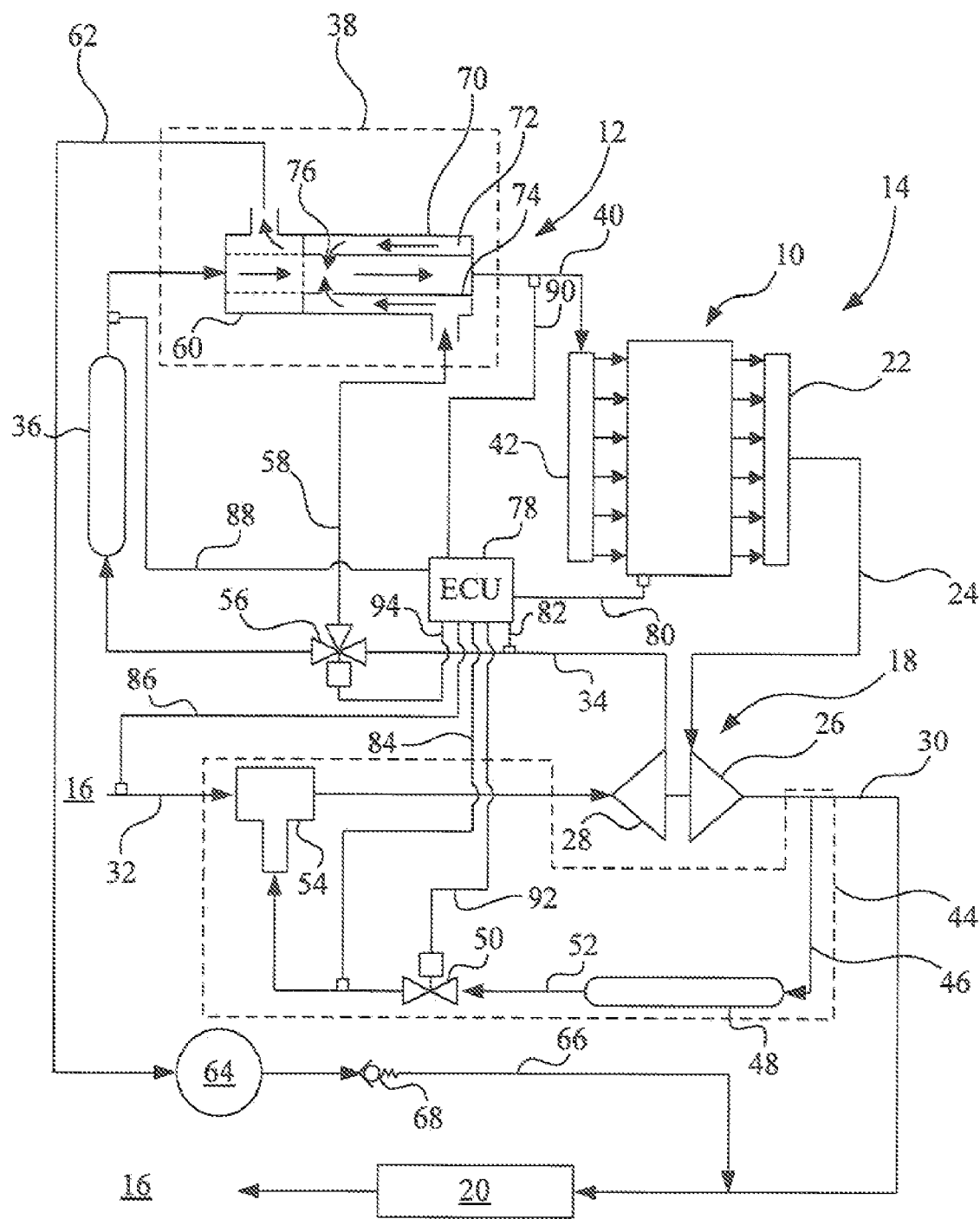
FIG. 1 shows a schematic system drawing illustrating the one form of the invention.

Referring to FIG. 1, there is shown an internal combustion engine generally indicated by reference character 10. Engine 10 is of the type that has pistons reciprocating within cylinders and connected to a crankshaft for producing a rotary power output. Details of the internal components of engine 10 are not shown to simplify an understanding of the present invention. The engine 10 receives air for combustion from an engine intake, generally referred to by reference character 12. Engine intake 12 includes a number of components that will be described in detail later. The purpose of the engine intake 12 is to supply air for combustion to the cylinders of engine 10.

Engine 10 may be of the compression ignition type in which intake air is compressed sufficiently that it causes combustion when diesel fuel is injected before the pistons reach their uppermost travel. Alternatively, engine 10 may be fueled by a mixture of natural gas and air which is ignited by a spark ignition device to produce combustion. There exist many other forms of combustion systems that may be applied to engine 10, including combinations of natural gas and diesel fuel as the energy source. Still other systems may be employed, such as gasoline or LPG fuel/air mixtures that are spark ignited.

Whatever combustion system is used, the products of combustion are carried from engine 10 by an engine exhaust, generally indicated by reference character 14. As with the engine intake 12, detailed components of the engine exhaust 14 will be described in detail below. The purpose of the engine exhaust 14 is to carry the gaseous products of combustion from the engine 10 to the atmosphere 16. Additional energy may be extracted from the exhaust 14 by a turbocharger 18 in the system. The gases in the exhaust may be purified by an exhaust after treatment device 20 which may include sound attenuating devices, particle filters and nitrous oxide reduction devices.

The engine exhaust 14 includes an exhaust manifold 22 receiving products of combustion from individual cylinders and delivering the exhaust gases through a conduit 24 to a turbine 26 of turbocharger 18. Turbine 26 of turbocharger 18 drives a compressor 28 for pressurizing air into the engine intake 12. Exhaust gases exiting turbine 26 pass through another exhaust conduit 30 to the exhaust aftertreatment device 20 for delivery to the atmosphere 16.

The engine intake 12 begins at an appropriate inlet conduit 32 extending to the inlet of turbocharger 28. The outlet of turbocharger compressor 28 is connected to an appropriate conduit 34 leading to a charge air cooler (CAC) 36. From there the intake 12 includes a liquid separator and charge air mixture device 38 connecting with a conduit 40 that leads to an intake manifold 42. Intake manifold 42 provides combustion air to individual cylinders within the internal combustion engine 10.

Internal combustion engine 10 may have an EGR system 44, shown within dashed lines in FIG. 1. As herein shown, EGR system 44 is of the low pressure type that extracts a portion of the exhaust gas flow from downstream of turbine 26 and directs it to inlet conduit 32 prior to entry to the turbocharger compressor 28. It should be apparent, however, to those skilled in the art that the EGR system 44 may also be a high pressure system wherein the exhaust gas is extracted from conduit 24 upstream of the turbocharger turbine 26. The EGR system includes a conduit 46 connected to conduit 30 downstream of turbine 26 and leading to an EGR cooler 48. EGR cooler 48 increases the density of the exhaust gases and is optionally available to use within the EGR system 44. The flow through the EGR system 44 is controlled by a valve 50 interposed in line 52 leading from the EGR cooler 48 to a mixer 54 that mixes the EGR flow from line 52 with the ambient air passing through compressor inlet conduit 32.

The fluid from compressor 28 passes through conduit 34 to charge air cooler 36 to increase its density. A valve, herein shown as a three-way valve 56, is interposed in conduit 34 upstream of CAC 36. Valve 56 has a bypass passage 58 connected to it for bypassing flow around the CAC 36 and to the liquid separator/charge air mixer 38.

The device 38 includes a liquid separator 60 interposed in series relationship with the output from CAC 36. Liquid separator 60 may be one of a number of types that promote and collect liquid droplets for delivery through a drain conduit 62 to a reservoir 64 and finally through a conduit 66 via check valve 68 to the engine exhaust 14 upstream of the exhaust after treatment device 20 and downstream of the turbocharger turbine 26. Although the conduit 62 is shown extending from the top of liquid separator 60 in the schematic FIG. 1, in practice, the conduit would be placed to allow liquid to flow by gravity from the separator 60. The bypass flow from conduit 58 passes to a charge air mixer 70 located downstream of liquid separator 60 and connected to inlet conduit 40. The charge air mixer 70 includes an annular passage 72 formed between the exterior of charge air mixer 70 and the main fluid flow conduit 74 leading to inlet conduit 40. As shown in FIG. 1, the flow from conduit 58 passes in a counter flow heat exchange relationship to the flow through conduit 74 and then mixes with the flow within conduit 74 through passages 76.

As shown herein, the intake 12 has an arrangement wherein the bypass flow comes into heat exchange relationship with the fluid flowing through conduit 74 and then is directed through passages 76 in a counter flow arrangement to mix with the main fluid flow. The benefit of such a relationship is that the wall of conduit 74 is heated to elevate the wall temperature sufficiently to prevent condensation, especially when the conditions of the fluid are near the dew point. By heating the conduit wall close to the output of the CAC 36, the heating has maximum effect. The subsequent mixing of the flows further prevents dew point conditions. It should be apparent to those skilled in the art that other forms of heat exchange relationship and mixing may be employed with similar results. Furthermore, the liquid separator 60 and charge air mixer 70 are shown as a common unit 38. It should also be apparent to those skilled in the art that these may be employed as separate units.

The control of bypass flow is selected so as to achieve a temperature at the output of the separator/mixer 38 that is above the dew point of the fluid flowing therethrough so that condensation and droplets do not enter into the engine intake 12, thereby producing adverse effects on the components and performance of engine 10. This control is dependent on a number of variables, including ambient conditions and engine operating conditions. Typically, the engine 10 is controlled by an electronic control unit (ECU) 78. ECU 78 receives a plurality of signal inputs from engine 10 via signal line or lines 80. In addition, the ECU 78 receives inputs from signal line 82 to compressor output conduit 34, signal line 84 at the output of the EGR valve 50, signal line 86 at the inlet 32 to the engine intake 12, signal line 88 to the output from CAC 36 and finally signal line 90 downstream of the separator/mixer 38. In addition to the signal lines passing to the ECU 78 there are command signal inputs passing through lines 80 to engine 10 and a command signal through line 92 to control the EGR valve 50 and a command signal line 94 to command the three-way valve 56.

The various sensors provide signals reflecting conditions which indicate the tendency for fluid to drop below its dew point and thus condense droplets in the engine intake 12. The CAC bypass flow through line 58 is increased to bring the temperature of the fluid passing out of the separator/mixer 38 to a level that is above the dew point of the fluid. The three-way valve 56 permits various flows including: no bypass, partial bypass and full bypass depending upon a number of conditions. Those conditions are engine rpm, load, engine intake temperature, intake pressure and coolant temperature. In addition, the ambient conditions such as the ambient pressure, ambient temperature and ambient humidity as sensed through signal line 86 are used to control the valve flow. The signal input from the amount of EGR flow is included in the control logic to provide the modulation necessary to avoid condensation because of the fluid dropping below its then current dew point.

In operation, the valve 56 may be commanded to produce full bypass flow during cold startup so as to provide maximum temperature in the conduit 40 leading to intake manifold 42. During normal operation, the valve 56 will vary the bypass flow to achieve the desired temperature and pressures to avoid the condition where the temperature of the fluid in the engine intake 12 drops below its dew point. By providing the liquid separator 60 immediately downstream of the charge air cooler 36, significant existing droplets may be removed from the system and the downstream heating and mixing further ensures that condensation does not occur.

Having described the preferred embodiment, it will become apparent that various modifications can be made without departing from the scope of the invention as defined in the accompanying claims.

The invention claimed is:

1. A system for controlling condensation in an intake of an internal combustion engine having a charge air cooler (CAC), said system comprising:
   a passage for air around said CAC and a valve for controlling air through said passage;
   a condensate trap in series flow relation in said engine intake downstream of said CAC for removing liquid from said engine intake fluid stream; and
   a mixer receiving fluid from said passage downstream of said condensate trap for at least mixing fluid from said passage with the engine intake to raise the temperature in said engine intake above the dew point of the fluid flowing therethrough.

2. A system as claimed in claim 1, wherein said bypass flow is in heat exchange relationship with the engine intake prior to mixing with the fluid flowing therethrough.

3. A system as claimed in claim 2, wherein said heat exchange relationship is substantially annular.

4. A system as claimed in claim 1, wherein said condensate trap and said mixer are a unitary unit.

5. A system as claimed in claim 1, wherein the valve for controlling fluid through said passage is controlled by an electronic control unit (ECU).

6. A system as claimed in claim 5, wherein the flow through said bypass is a function of at least one of engine rpm, load, intake temperature, intake pressure and coolant temperature.

7. A system as claimed in claim 5, wherein the flow through said bypass is a function of at least one of ambient pressure, temperature and humidity.

8. A method of operating an internal combustion engine having an intake and charge air cooler (CAC) comprising the steps of:
   trapping condensate downstream of said CAC in said engine intake;
   providing a selective engine intake bypass flow around said CAC;
   mixing said bypass flow into said engine intake downstream of the trapping of condensate.

9. A method as claimed in claim 8, wherein said bypass flow is placed in heat exchange relationship with the engine intake.

10. A method as claimed in claim 9, wherein said bypass flow is placed in heat exchange relationship with said intake prior to mixing.

11. A method as claimed in claim 8, wherein said bypass flow is a function of at least one of engine rpm, load, intake temperature, intake pressure and coolant temperature.

12. A method as claimed in claim 8, wherein said bypass flow is a function of at least one of ambient pressure, temperature, and humidity.

13. An internal combustion system comprising:
   an internal combustion engine having at least an air intake;
   a device in said air intake for pressurizing air;
   a charge air cooler (CAC) downstream of said pressurizing device;
   a bypass passage for air around said CAC; and
   a valve for controlling air through said bypass passage;
   a condensate trap in series flow relation in said intake downstream of said CAC for removing liquid from said intake fluid stream; and
   a mixer receiving fluid from said condensate trap for at least mixing fluid from said bypass passage with the air intake to raise the temperature in said intake above the dew point of the fluid flowing therethrough.

14. An internal combustion engine system as claimed in claim 13, wherein said mixer places said bypass flow in heat exchange relationship with said engine intake.

15. An internal combustion engine system as claimed in claim 14, wherein said mixer passes said bypass flow over a wall delineating at least a portion of the intake for said heat exchange relationship and then mixes it with the intake.

16. An internal combustion engine system as claimed in claim 15, wherein said wall is substantially annular and the relationship is a counter flow heat exchange.

17. An internal combustion engine system as claimed in claim 13, wherein said condensate trap and mixer are a combined unit.

18. An internal combustion engine system as claimed in claim 13, further comprising an ECU for controlling said engine and wherein said valve for controlling bypass air is responsive to said ECU.

19. An internal combustion engine system as claimed in claim 18, wherein the flow through said bypass is a function of at least one of engine operating parameters and ambient conditions.

20. An internal combustion engine system as claimed in claim 13, further comprising a turbocharger for pressurizing air for flow to said CAC.

21. An internal combustion engine system as claimed in claim 20, further comprising an exhaust after treatment device for receiving the exhaust products from said turbocharger.

22. An internal combustion engine system as claimed in claim 21, wherein the condensate from said condensate trap is passed to said exhaust after treatment system downstream of said turbocharger.

23. An internal combustion engine system as claimed in claim 19 further comprising an exhaust gas recirculation (EGR) system and wherein said bypass flow is also a function of EGR flow.

* * * * *